United States Patent [19]

Ohtaka et al.

[11] Patent Number: 5,797,049
[45] Date of Patent: Aug. 18, 1998

[54] FOCUS DETECTION DEVICE FOR OBJECTIVE LENS

[75] Inventors: Keiji Ohtaka, Yokohama; Yusuke Ohmura, Tokyo, both of Japan

[73] Assignee: Canon Kabushiki Kaisha, Tokyo, Japan

[21] Appl. No.: 762,252

[22] Filed: Dec. 9, 1996

Related U.S. Application Data

[63] Continuation of Ser. No. 241,574, May 12, 1994, abandoned.

[30] Foreign Application Priority Data

May 20, 1993 [JP] Japan .................................. 5-141334

[51] Int. Cl.$^6$ .................................................. G01J 1/20
[52] U.S. Cl. .................. 396/122; 396/89; 396/111; 396/121
[58] Field of Search ........................... 396/89–93, 111, 396/121–123

[56] References Cited

U.S. PATENT DOCUMENTS

| | | | |
|---|---|---|---|
| 4,555,169 | 11/1985 | Suda et al. | 354/407 |
| 4,618,236 | 10/1986 | Akashi et al. | 354/406 |
| 4,634,255 | 1/1987 | Suda et al. | 354/406 |
| 4,643,557 | 2/1987 | Ishizaki et al. | 354/406 |
| 4,670,645 | 6/1987 | Ohtaka et al. | 250/201 |
| 4,688,920 | 8/1987 | Suda et al. | 354/406 |
| 4,699,493 | 10/1987 | Koyama et al. | 354/406 |
| 4,716,282 | 12/1987 | Akashi et al. | 250/201 |
| 4,728,785 | 3/1988 | Ohnuki et al. | 250/201 |
| 4,774,539 | 9/1988 | Suda et al. | 354/406 |
| 4,792,668 | 12/1988 | Akashi et al. | 250/201 |
| 4,792,669 | 12/1988 | Ohnuki et al. | 250/201 |
| 4,800,410 | 1/1989 | Akashi et al. | 354/408 |
| 4,801,963 | 1/1989 | Koyama et al. | 354/403 |
| 4,812,869 | 3/1989 | Akashi et al. | 354/408 |
| 4,825,239 | 4/1989 | Suda et al. | 354/402 |
| 4,833,313 | 5/1989 | Akashi et al. | 250/201 |
| 4,841,326 | 6/1989 | Koyama et al. | 354/406 |
| 4,849,782 | 7/1989 | Koyama et al. | 354/408 |
| 4,859,842 | 8/1989 | Suda et al. | 250/201 |
| 4,907,026 | 3/1990 | Koyama et al. | 354/403 |
| 4,922,282 | 5/1990 | Koyama et al. | 354/406 |
| 4,954,701 | 9/1990 | Suzuki et al. | 250/201.8 |
| 4,959,677 | 9/1990 | Suda et al. | 354/402 |
| 4,975,727 | 12/1990 | Ohtaka et al. | 354/402 |
| 4,992,817 | 2/1991 | Aoyama et al. | 354/403 |
| 4,992,819 | 2/1991 | Ohtaka et al. | 354/408 |
| 5,005,041 | 4/1991 | Suda et al. | 354/407 |
| 5,258,801 | 11/1993 | Kusaka et al. | 354/402 |
| 5,264,890 | 11/1993 | Komiya | 354/402 |
| 5,311,004 | 5/1994 | Kusaker | 354/408 X |
| 5,353,089 | 10/1994 | Yaigi | 354/402 |
| 5,373,340 | 12/1994 | Tokagi | 354/400 |

FOREIGN PATENT DOCUMENTS

| | | |
|---|---|---|
| 59-107313 | 2/1984 | Japan. |
| 59-107311 | 6/1984 | Japan. |

*Primary Examiner*—Daniel P. Malley
*Attorney, Agent, or Firm*—Fitzpatrick, Cella, Harper & Scinto

[57] ABSTRACT

A focus detection function is disposed on the focal plane of an objective lens. The in-focus state of the objective lens is determined with respect to a plurality of range-finding regions in a photographic range by employing the focus detection function. A correction value of the objective lens corresponding to a predetermined range-finding region among the plurality of range-finding regions is already stored, thereby finding correction values corresponding to regions other than the predetermined region. As a result, focus detection with respect to the regions other than the predetermined region can be performed.

10 Claims, 7 Drawing Sheets

FOCUS DETECTION DEVICE FOR OBJECTIVE LENS

This application is a continuation of application Ser. No. 08/241,574, filed May 12, 1994, now abandoned.

BACKGROUND OF THE INVENTION

1. Field of the Invention

The present invention relates to a focus detection device suitable for photographic cameras, video cameras, and the like. More particularly, the invention relates to a focus detection device in which a pupil of an objective lens is divided into a plurality of regions and the distributions of a quantity of light with respect to a plurality of object images are formed with light transmitted through the respective regions so as to find the relative relationship of the positions of the plurality of the distributions of a quantity of light, thereby appropriately detecting an in-focus state of the objective lens with respect to the plurality of regions in the photographic range.

2. Description of the Related Art

Conventionally, the so-called "image offset method" is available for a light-receiving type focus detection method employed by utilizing light transmitted through an objective lens. The image offset method is disclosed in, for example, Japanese Patent Laid-Open Nos. 59-107311 and 59-107313.

Figure 7:
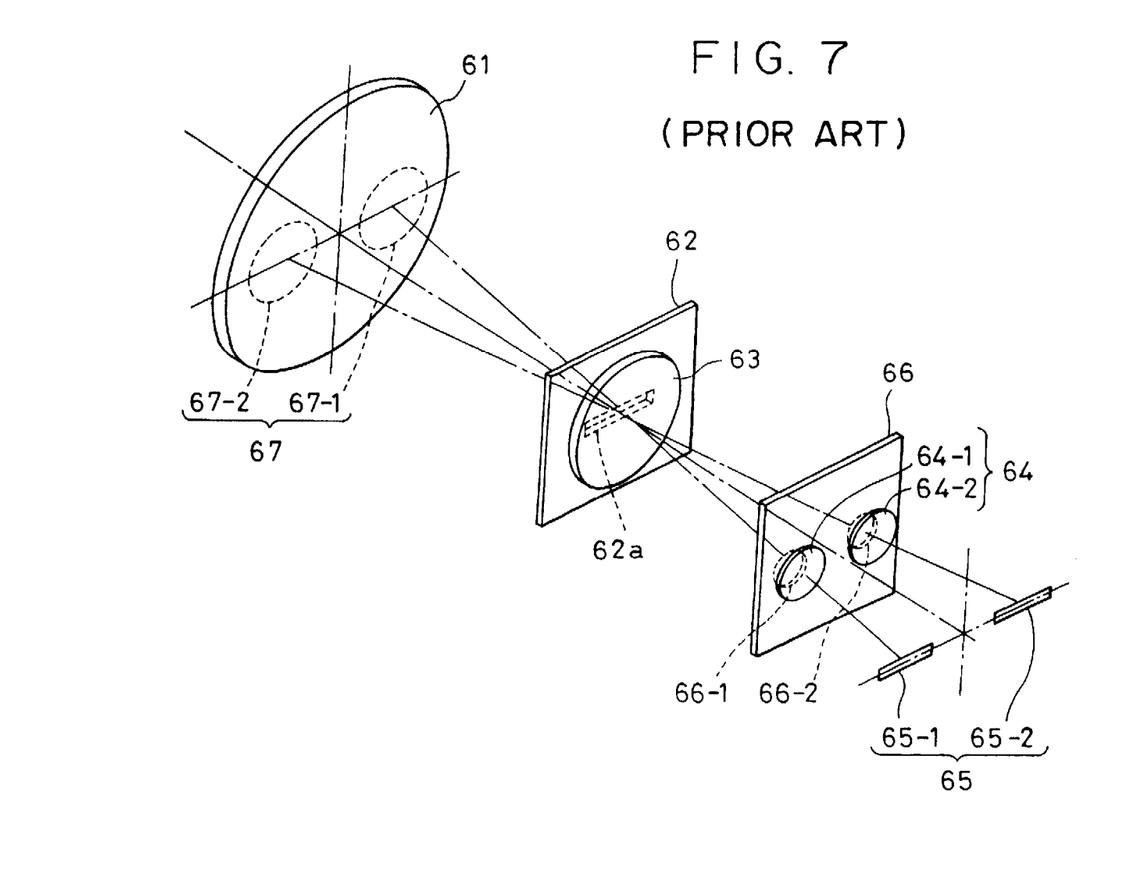
FIG. 7 is a schematic view of a portion of a conventional focus detection device employing the image offset method.

FIG. 7 is a schematic view of an optical system of a focus detection device employing the conventional image offset method. Referring to FIG. 7, the optical system includes an objective lens 61, a field mask 62 placed in the vicinity of an expected focal plane of the objective lens 61, and a field lens 63 placed in the vicinity of the expected focal plane. This system further includes a secondary optical system 64, light-receiving means 65, a stop 66 and an exit pupil 67 of the objective lens 61. The secondary optical system 64 comprises two lenses 64-1 and 64-2 placed symmetrical to each other with respect to the optical axis of the objective lens 61. The light-receiving means 65 has two arrays of light-receiving elements 65-1 and 65-2 placed to the rear of the two lenses 64-1 and 64-2, respectively. The stop 66 has two apertures 66-1 and 66-2 in front of the two lenses 64-1 and 64-2, respectively. The exit pupil 67 comprises two separated regions 67-1 and 67-2.

A field lens 63 serves the function of forming an image of the apertures 66-1 and 66-2 of the stop 66 on the two regions 67-1 and 67-2 of the exit pupil 67 so that light transmitted through the respective regions 67-1 and 67-2 forms the distributions of a quantity of light on the light-receiving elements 65-1 and 65-2, respectively.

In the focus detection device shown in FIG. 7, when the focal point of the objective lens 61 is in front of an expected focal plane, the position of the distribution of a quantity of light with respect to the image formed on the array of the light-receiving element 65-1 is close to that formed on the array of the light-receiving element 65-2. On the other hand, when the focal point of the objective lens 61 is behind the expected focal plane, the position of the distribution of a quantity of light with respect to the image formed on the array of the light-receiving element 65-1 is away from that formed on the array of the light-receiving element 65-2. The displacement between the distributions of quantities of light formed on the light-receiving element 65-1 and light-receiving element 65-2 is a function of the defocusing amount of the objective lens 61. Thus, such a defocusing amount is calculated by suitable calculation means, thereby enabling the detection of the defocusing direction and amount of movement required of the objective lens 61.

The focus detection device shown in FIG. 7 performs range-finding corresponding to the subject which is photographed by the objective lens and is positioned substantially at the center of the subject range.

In contrast thereto, the present inventor has already proposed a focus detection device in U.S. Pat. No. 5,005,041, issued Apr. 2, 1991, which can also detect the in-focus state with respect to range-finding points other than a range-finding point at the center of the photographic range.

Figure 8:
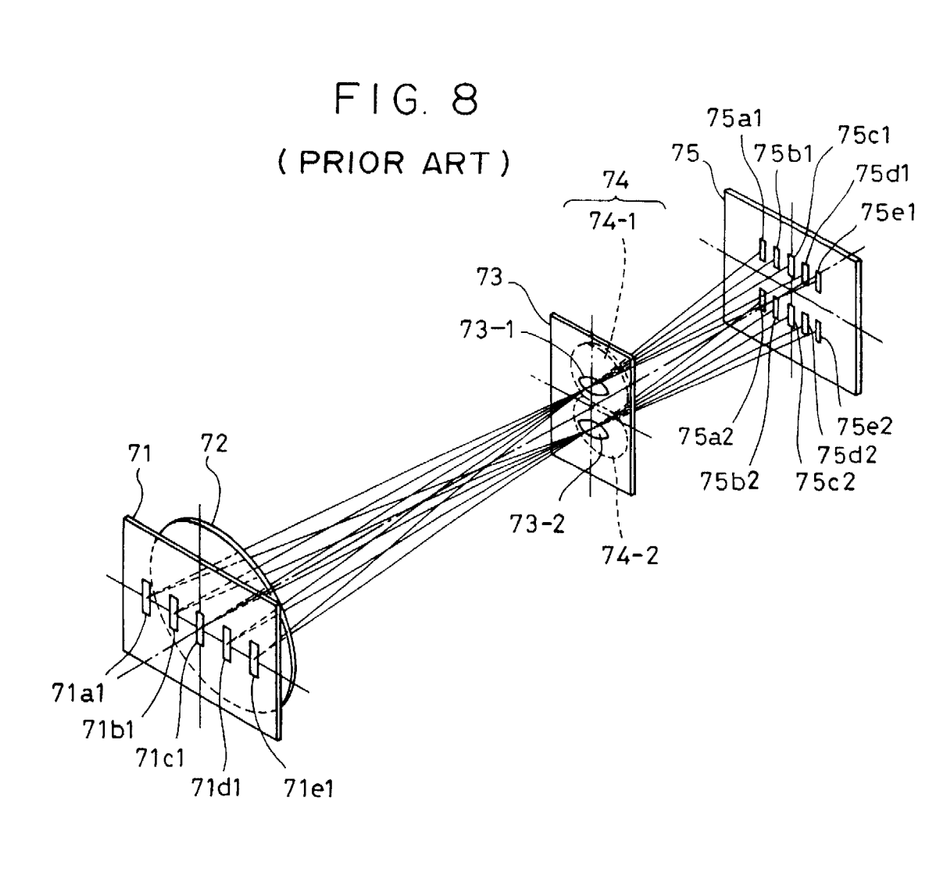
FIG. 8 is a schematic view of a portion of a conventional focus detection device employing the image offset method.

FIG. 8 is a schematic view of an optical system of a focus detection device for a plurality of range-finding points. Such a device is disclosed in U.S. Pat. No. 5,005,041 and includes a field mask 71, a field lens 72, a stop 73 having two apertures 73-1 and 73-2, a secondary optical system 74 formed of two lenses 74-1 and 74-2, and a sensor 75. The objective lens 61 shown in FIG. 7 is omitted.

The field mask 71 has a plurality of apertures 71a1–71e1 corresponding to a plurality of fields, respectively, to be measured. Light is regulated by the field mask 71 and a plurality of pairs of the distributions of quantities of light are formed by the secondary optical system 74 so that a plurality of pairs of sensor arrays, 75a1 and 75a2, 75b1 and 75b2, 75c1 and 75c2, 75d1 and 75d2, and 75e1 and 75e2, can receive the resulting distributions of light, respectively.

The focus detection device shown in FIG. 8 performs range-finding with respect to five regions overall, that is, a central portion and four peripheral portions of a photographing screen. It is very important that the device having such a simple construction be able to detect the in-focus state in a plurality of regions in the photograph screen when the device is applied to a camera.

Since the focus detection device shown in FIG. 8 is constructed such that two distributions of quantities of light formed on the sensor move vertically depending upon the in-focus state of the objective lens, it is only capable of range-finding with respect to objects in which the distribution of a quantity of light varies only vertically. The device is not able to perform range-finding with respect to objects in which the distribution of a quantity of light varies only horizontally, for example, a black-and-white edge pattern having a vertical boundary.

In order to solve the above-noted problems the present inventor proposes a focus detection device, which is able to perform range-finding with respect to objects in which the distribution of a quantity of light varies either only vertically or only horizontally in the central portion of the photographic region of the device and also is able to perform range-finding with respect to objects in a plurality of portions other than the central portion.

Figure 9:
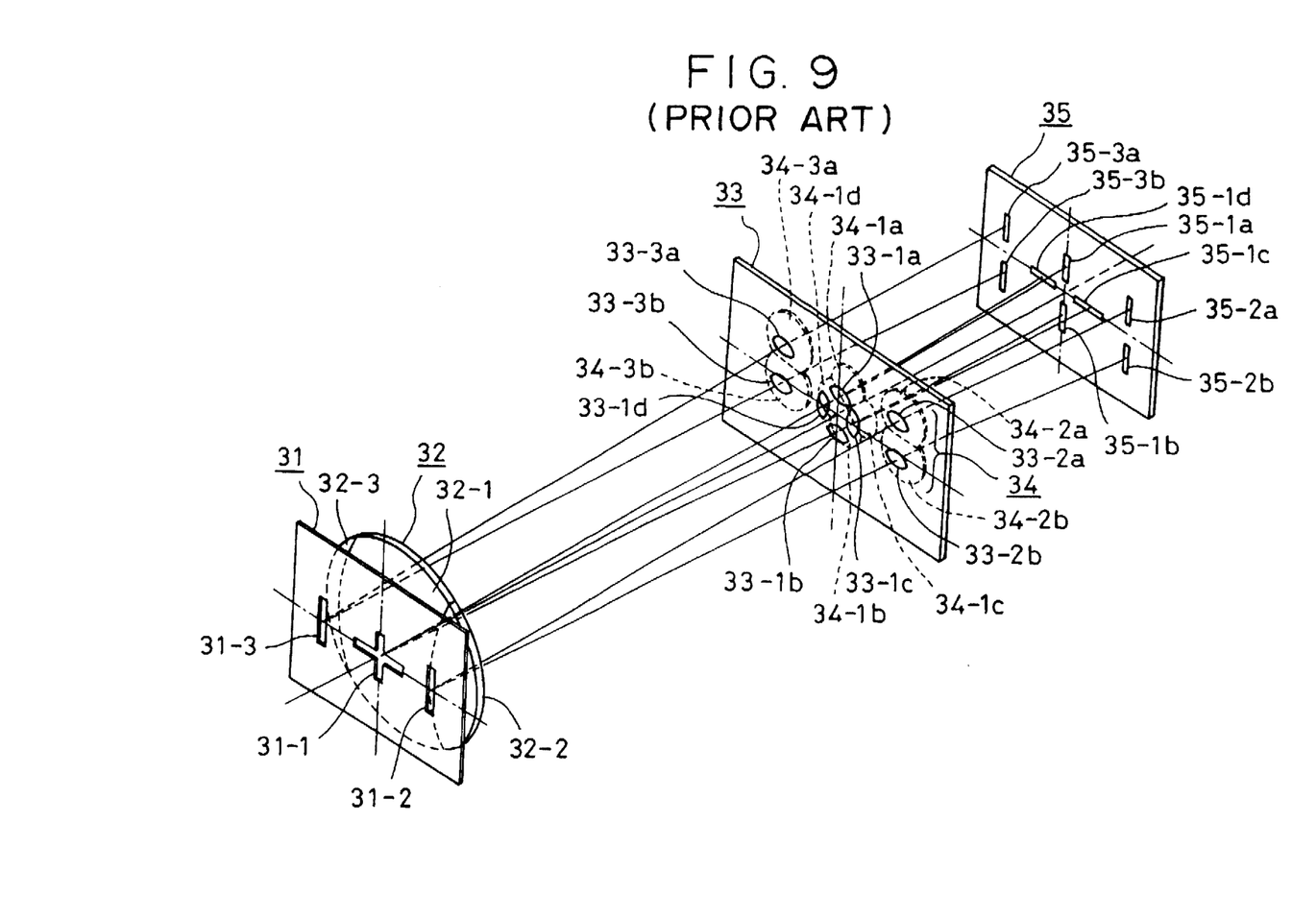
FIG. 9 is a schematic view of a portion of a conventional focus detection device employing the image offset method.

FIG. 9 is a schematic view of the focus detection device disclosed in U.S. Pat. No. 4,992,819, which issued Feb. 12, 1991.

A field mask 31 has a cross-like aperture 31-1, two portions of which intersect with each other substantially at the center of the photographic screen formed by an objective lens (photographic lens) (not shown) and longitudinal apertures 31-2 and 31-3 at the peripheral portions of the field mask 31. A field lens 32 comprises three regions 32-1, 32-2 and 32-3 having respective predetermined optical characteristics corresponding to the three apertures, 31-1, 31-2 and 31-3, respectively, of the field mask 31. A stop 33 comprises at the center thereof four apertures 33-1 comprising 33-1a, 33-1b, 33-1c and 33-1d, one pair at each vertical and horizontal portions at the center thereof and also one pair of apertures 33-2a and 33-2b, and another pair of apertures 33-3a and 33-3b at the peripheral portions thereof.

The regions 32-1, 32-2 and 32-3 of the field lens 32 serve the function of forming an image of the apertures 33-1, 33-2 and 33-3, respectively, of the stop 33 in the vicinity of the exit pupil of the photographic lens (not shown).

A secondary optical system 34 includes a total of four pairs of secondary image-forming lenses. That is, the secondary optical system 34 comprises eight secondary image-formation lenses 34-1a, 34-1b, 34-1c, 34-1d, 34-2a, 34-2b, 34-3a and 34-3b which are placed at the rear of the respective apertures of the stop 33.

An array of light-receiving elements (sensor) 35 has a total of 4 pairs of sensors, that is, eight sensors 35-1a, 35-1b, 35-1c, 35-1d, 35-2a, 35-2b, 35-3a and 35-3b placed in correspondence to the respective secondary image-forming lenses so that they can receive the formed image.

Figure 10:
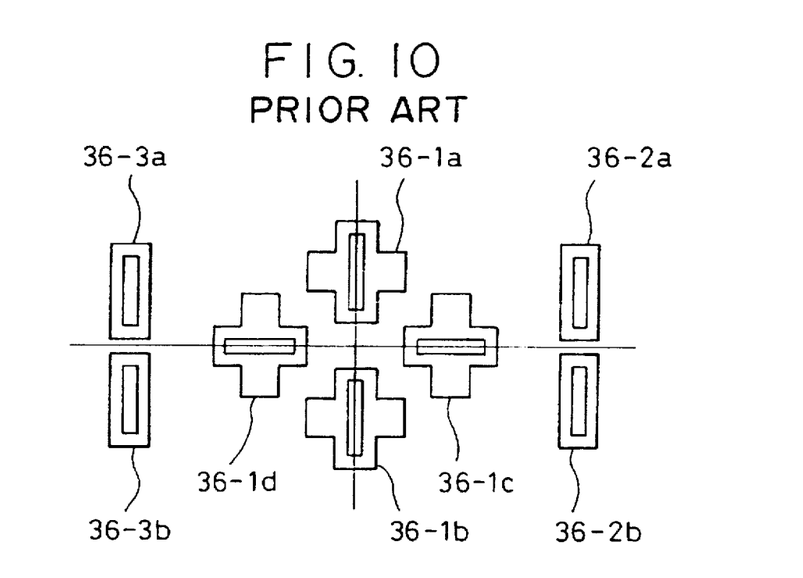
FIG. 10 is a schematic view of a portion of the focus detection device shown in FIG. 9.

FIG. 10 is a schematic view of the image regions formed on the surface of the sensor 35 illustrated in FIG. 9. Image regions 36-1a, 36-1b, 36-1c and 36-1d are the ones in which an image of the aperture 31-1 at the center of the field mask 31 is formed and show the state in which light transmitted through the central region 32-1 of the field lens 32 is regulated in the apertures 33-1a, 33-1b, 33-1c and 33-1d, respectively, of the stop 33 and an image is then formed on the surface of the sensor 35 by the secondary image-forming lenses 34-1a, 34-1b, 34-1c and 34-1d, respectively, which are placed at the rear of the respective apertures of the stop 33.

Image regions 36-2a and 36-2b are the ones in which an image of the peripheral aperture 31-2 of the field mask 31 is formed and show the state in which light transmitted through the peripheral region 32-2 of the field lens 32 is regulated in the apertures 33-2a and 33-2b, respectively, of the stop 33 and an image is then formed on the surface of the sensor 35 by the secondary image-forming lenses 34-2a and 34-2b, respectively, placed at the rear of the respective apertures of the stop 33.

Likewise, image regions 36-3a and 36-3b are the ones in which an image of the peripheral aperture 31-3 of the field mask 31 is formed and show the state in which light transmitted through the peripheral region 32-3 of the field lens 32 is regulated in the apertures 33-3a and 33-3b, respectively, of the stop 33 and an image is then formed on the surface of the sensor 35 by the secondary image-forming lenses 34-3a and 34-3b, respectively, placed at the rear of the respective apertures of the stop 33.

Theoretically, the focus detection device shown in FIG. 9 detects the relative positions of the images in the direction in which a pair of arrays of sensors are disposed, in a manner similar to the conventional devices.

Since the focus detection device is constructed as described above, it is possible to perform, in the vicinity of the center of the range to be photographed or observed by the objective lens (not shown), range-finding with respect to the objects in which the distribution of a quantity of light varies either only vertically or only horizontally, and it is also possible to perform range-finding with respect to the objects positioned in correspondence to the peripheral apertures 31-2 and 31-3 of the field mask 31.

In general, exchangeable photographic lenses used in, for example, a single-lens reflex camera, have various types of aberration inherent therein, and consequently, the amount of aberration and methods of correcting it vary depending upon the types of lenses. Hence, when the focus detection device as described above is applied to a camera including an exchangeable photographic lens and the actuation of a photographic lens (an in-focus lens) is controlled on the basis of a focus detection signal directly obtained in the focus detection device, an appropriate in-focus state may not be obtained.

In order to solve the above-mentioned problem, the following focus detection device has been proposed. A focus detection signal D, for example, representing the defocusing amount, is corrected by utilizing a correction value C inherent in each of the photographic lenses for the focus detection signal, as expressed by the following equation:

$$D_C = D - c \quad (1)$$

The actuation of the in-focus lens is controlled on the basis of the thus-obtained focus detection corrected signal $D_C$.

In general, the correction value C inherent in the different types of photographic lenses is also dependent upon the position of the detection region (range-finding region). Therefore, when the photographic lens has detection regions other than the center of the photographic range as shown in FIGS. 8 and 9, it is necessary to have correction values corresponding to the respective detection regions. However, another problem arises in such a case. When the number of expected detection regions is large, a storage device with a large capacity is required in order to store correction values corresponding to all the detection regions in the photographic lens or the camera body, and the I/O control of the correction values when calculating the focus detection signals becomes complicated.

Further, a photographic system including a single-lens reflex camera or an exchangeable lens may sometimes be actuated only for a predetermined number of detection regions or placed in a predetermined position, in which case, a camera containing a focus detection device having a number of detection regions different from the predetermined number or placed in positions different from the above-described position cannot be used in such a system unless it is modified. In order to modify the above camera to make it suitable for such a system, all the new correction values must be stored in the camera body, and accordingly, a storage device having a large capacity is also required.

SUMMARY OF THE INVENTION

Accordingly, an object of the present invention is to provide a focus detection device which is capable of performing highly-precise focus detection without requiring a storage element with a high-density capacity because focus detection signals in a plurality of regions (range-finding regions) are corrected by using correction values with respect to the respective photographic lenses and employing a simple calculation process.

The invention in one aspect pertains to a focus detection device for an objective lens comprising detection means for detecting the focus state of the objective lens with respect to a plurality of regions in the field, and producing means for producing, on basis of a correction value for correcting a detection signal obtained by the detection means with respect to a predetermined region among the plurality of regions, a correction value for correcting a detection signal obtained by the detection means with respect to the region other than said predetermined region.

In order to achieve the above object, the present invention in another aspect pertains to a focus detection device comprising: an objective lens means; detection means for detecting the focus state of the objective lens means with respect to a plurality of regions in the field; storage means for storing a correction value for correcting a detection signal obtained by the detection means with respect to a predetermined region among the plurality of regions; and production means for producing a correction value for correcting a detection signal obtained by the detection means with respect to each of the regions other than the predetermined region on the basis of the correction value stored in the storage means.

Further objects, features and advantages of the present invention will become apparent from the following description of the preferred embodiments with reference to the attached drawings.

DETAILED DESCRIPTION OF THE PREFERRED EMBODIMENTS

Figure 1:
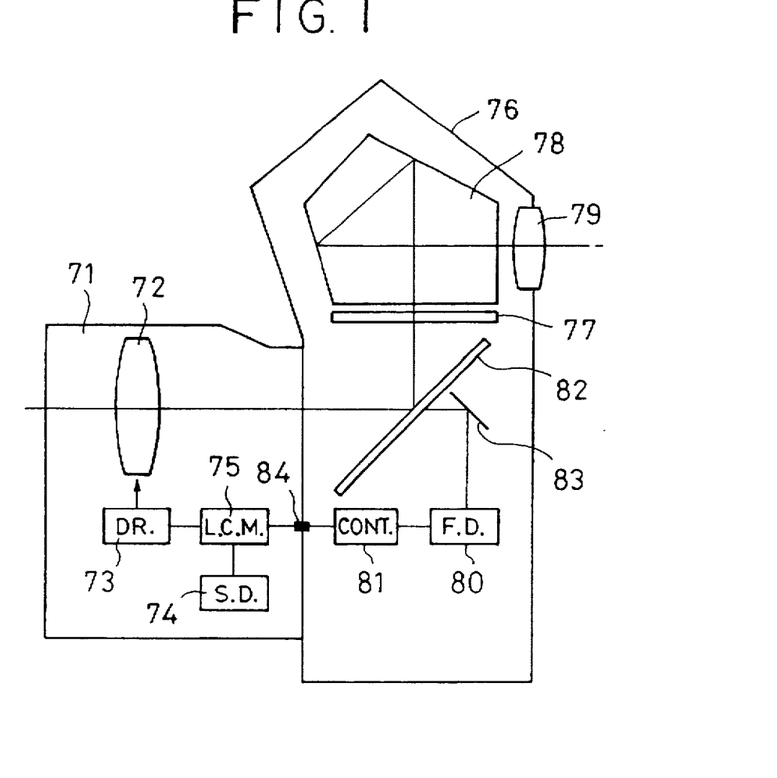
FIG. 1 is a schematic view of a portion of a first embodiment according to the present invention.
Figure 2:
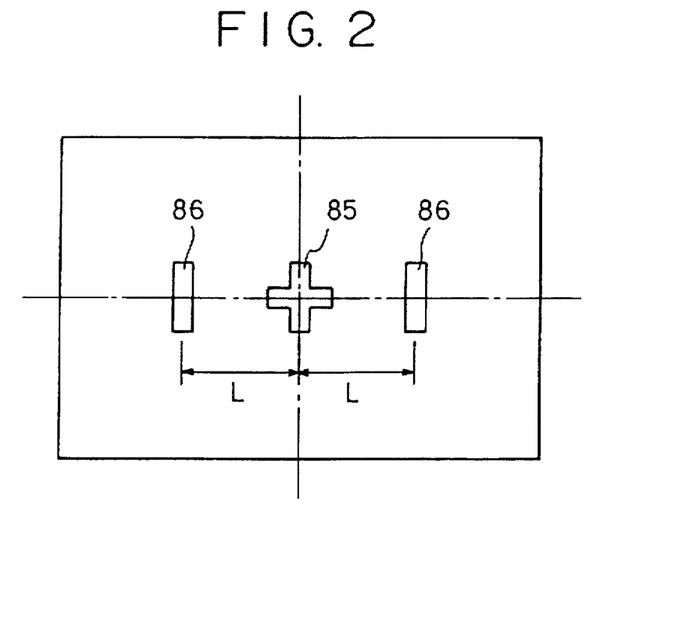
FIG. 2 is a schematic view of the range to be found shown in FIG. 1.

FIG. 1 is a schematic view of a first embodiment according to the present invention. FIG. 2 is an enlarged view of a portion of the first embodiment shown in FIG. 1.

Referring to FIG. 1, a photographic body 71 includes: a photographic lens 72; a drive device (D.R.) 73 for shifting the entire lens system comprising the photographic lens 72 or an in-focus lens, which is a part of the lens system, so as to adjust the in-focus state of the photographic lens 72; a storage device (S.D.) 74 such as a ROM, or the like; and lens controlling means (L.C.M.) 75 for controlling the storage device 74.

A camera body 76 includes: a focus plate 77 on which an object image is formed by the photographic lens 72; a pentagonal prism 78; a finder system having an eyepiece 79, a focus detection system having focus detection means (F.D.) 80 and control means (CONT.) 81 for controlling the detection means 80; a main mirror 82 for introducing light from the photographic lens 72 into the finder system, and a subsidiary mirror 83 for introducing light from the photographic lens 72 to the focus detection means 80. When connected, the photographic lens body 71 and the camera body 76 have an electric contact 84 through which information is communicated and the power is supplied.

The focus detection means 80 of this embodiment has similar components to those shown in FIG. 9 and the range-finding principle is also similar to that shown in FIG. 9.

FIG. 2 shows the focus detection regions on the focus plate 77 illustrated in FIG. 1 when the focus detection device illustrated in FIG. 9 is employed as the detection means 80. A cross-like region 85 at the center and peripheral narrow regions 86 the distance L away from the center form the focus detection regions corresponding to the configuration of the apertures of the field mask 31 or the arrangement of the sensor 35 shown in FIG. 9.

The photographic lens body 71 has correction values C(O) and C(L') stored within the ROM 74 for the above focus detection signal D with respect to the central region and the peripheral regions the distance L' away from the center, respectively.

In the photographic device illustrated in FIG. 1, when the central region, for example, is selected in advance as a focus detection region, the focus detection system is started by such means as the initial pressing of a shutter button (not shown), thereby detecting the amount of the in-focus state with respect to the central region of the photographic lens 72, for example, the defocusing amount D(O). Subsequently, the correction value C(O) with respect to the focus detection central region stored in the ROM 74 of the photographic lens body 71 is read into the control means 81 of the focus detection system through the contact point 84.

The final focus detection corrected signal $D_c(O)$ can be found by the following equation:

$$D_c(O)=D(O)-C(O) \tag{2}$$

The in-focus lens is actuated by the drive device 73 of the photographic lens body 71 on the basis of the above value, thereby adjusting the focus state.

Likewise, the defocusing amount D(L) is detected with respect to the focus detection peripheral regions distance L away from the center. When the following equation applies, $$L=L' \tag{3}$$

the correction value C(L') stored within the ROM 74 of the photographic lens body 71 can be directly employed and the focus detection corrected value $D_c(L)$ can be found by the following equation:

$$D_c(L)=D(L)-C(L') \tag{4}$$

On the other hand, when the equation (3) does not apply, as being expressed by the following formula, $$L \neq L' \tag{5}$$

the correction value C(L) is found by the following calculation in the present invention.

That is, suppose that the correction value C(x) with respect to the focus detection region distance x away from the center can be found by the following linear equation of x, $$C(x)=ax+b \tag{6}$$

the coefficients a and b are found by the two correction values C(O) and C(L') stored within the ROM 74 of the photographic lens body 71, thereby calculating the correction value C(x) with respect to the region any distance x away from the center.

According to the above-described simple calculation, the coefficients a and b are found by the following equations:

$$a = \frac{C(L') - C(O)}{L'} \quad (7)$$

$$b = C(O) \quad (8)$$

The equation (6) can be expressed by the following equation:

$$C(X) = \frac{C(L') - C(O)}{L'} X + C(O) \quad (9)$$

Thus, the correction value C(L) can be found by the following equation:

$$C(L) = \frac{C(L') - C(O)}{L'} L + C(O) \quad (10)$$

The focus detection corrected signal $D_C(L)$ is calculated by the above equation.

Figure 3:
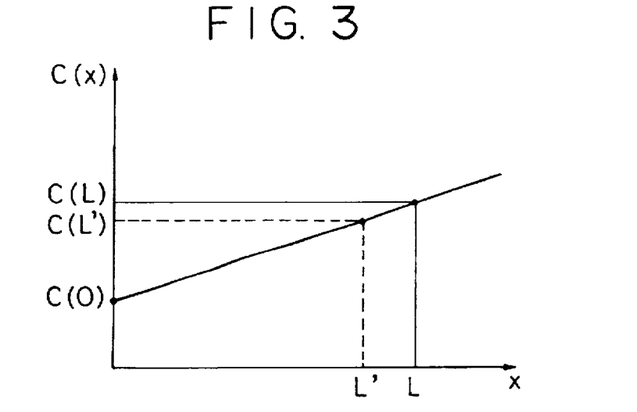
FIG. 3 is a graph illustrating the relationship between the correction value and the range to be found according to the present invention.

FIG. 3 is a graph illustrating the relationship of the equation (9) in which the vertical axis indicates the correction value C(x) and the horizontal axis represents the distance x. According to this equation, a correction value can be found not only when x is equal to L, but also when x is any value.

The present invention may be modified such that, for example, the following quadratic equation of x may be substituted for the linear equation including x shown in the equation (6) in another embodiment:

$$C(x) = ax^2 + bx + C \quad (11)$$

Or, an equation of an even higher degree than the power of 2 may be used. Since there are three unknown coefficients in the equation (11), it is necessary to store three known correction values within the ROM 74 of the photographic lens body 71.

If the three correction values are $C(L_1)$, $C(L_2)$, and $C(L_3)$, the coefficients of the equation (11) can be found by the following equations:

$$a = \frac{\begin{vmatrix} C(L_1) & L_1 & 1 \\ C(L_2) & L_2 & 1 \\ C(L_3) & L_3 & 1 \end{vmatrix}}{\begin{vmatrix} L_1^2 & L_1 & 1 \\ L_2^2 & L_2 & 1 \\ L_3^2 & L_3 & 1 \end{vmatrix}} \quad (12)$$

$$b = \frac{\begin{vmatrix} L_1^2 & C(L_1) & 1 \\ L_2^2 & C(L_2) & 1 \\ L_3^2 & C(L_3) & 1 \end{vmatrix}}{\begin{vmatrix} L_1^2 & L_1 & 1 \\ L_2^2 & L_2 & 1 \\ L_3^2 & L_3 & 1 \end{vmatrix}} \quad (13)$$

$$c = \frac{\begin{vmatrix} L_1^2 & L_1 & C(L_1) \\ L_2^2 & L_2 & C(L_2) \\ L_3^2 & L_3 & C(L_3) \end{vmatrix}}{\begin{vmatrix} L_1^2 & L_1 & 1 \\ L_2^2 & L_2 & 1 \\ L_3^2 & L_3 & 1 \end{vmatrix}} \quad (14)$$

wherein |A| is the determinant of the matrix A.

Figure 4:
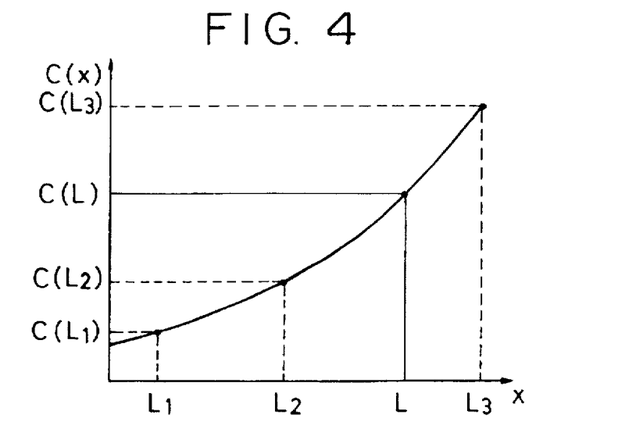
FIG. 4 is a graph illustrating the relationship between the correction value and the range to be found according to the present invention.

FIG. 4 is a graph illustrating the relationship of the equation (11) by employing the thus-obtained coefficients by way of example.

Instead of employing the three known correction values as described above, the coefficients of the square equation (11) may be determined by the two correction values C(O) and C(L') with respect to the central and peripheral regions, respectively, and on the assumption that the correction value take the extreme value with respect to the central region. According to this method, the correction value is found by the following equation:

$$C(X) = \frac{C(L') - C(O)}{L'^2} X^2 + C(O) \quad (15)$$

Figure 5:
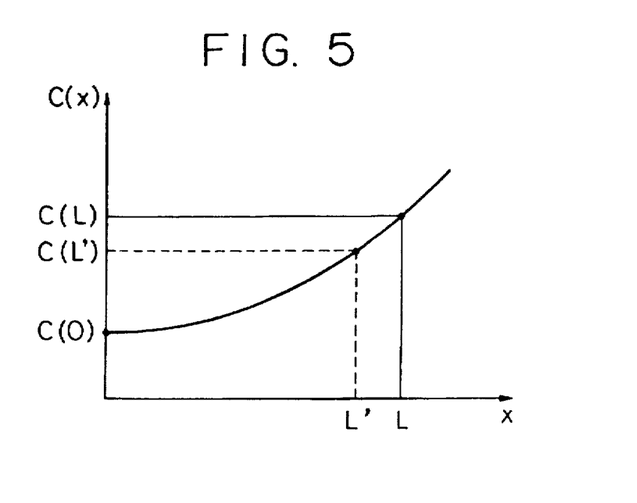
FIG. 5 is a graph illustrating the relationship between the correction value and the range to be found according to the present invention.

FIG. 5 is a graph illustrating the relationship of equation (15).

Although, in the above embodiment, the values stored in the ROM 74 of the photographic lens body 71 are used as the known correction values, the correction values may be stored in the camera body 76 and employed as the known correction values.

Also, the present invention is not limited to the above embodiment, but other forms of functions may be set according to the characteristics or the number of correction values inherent in the photographic lens body 71 or the camera body 76.

Figure 6:
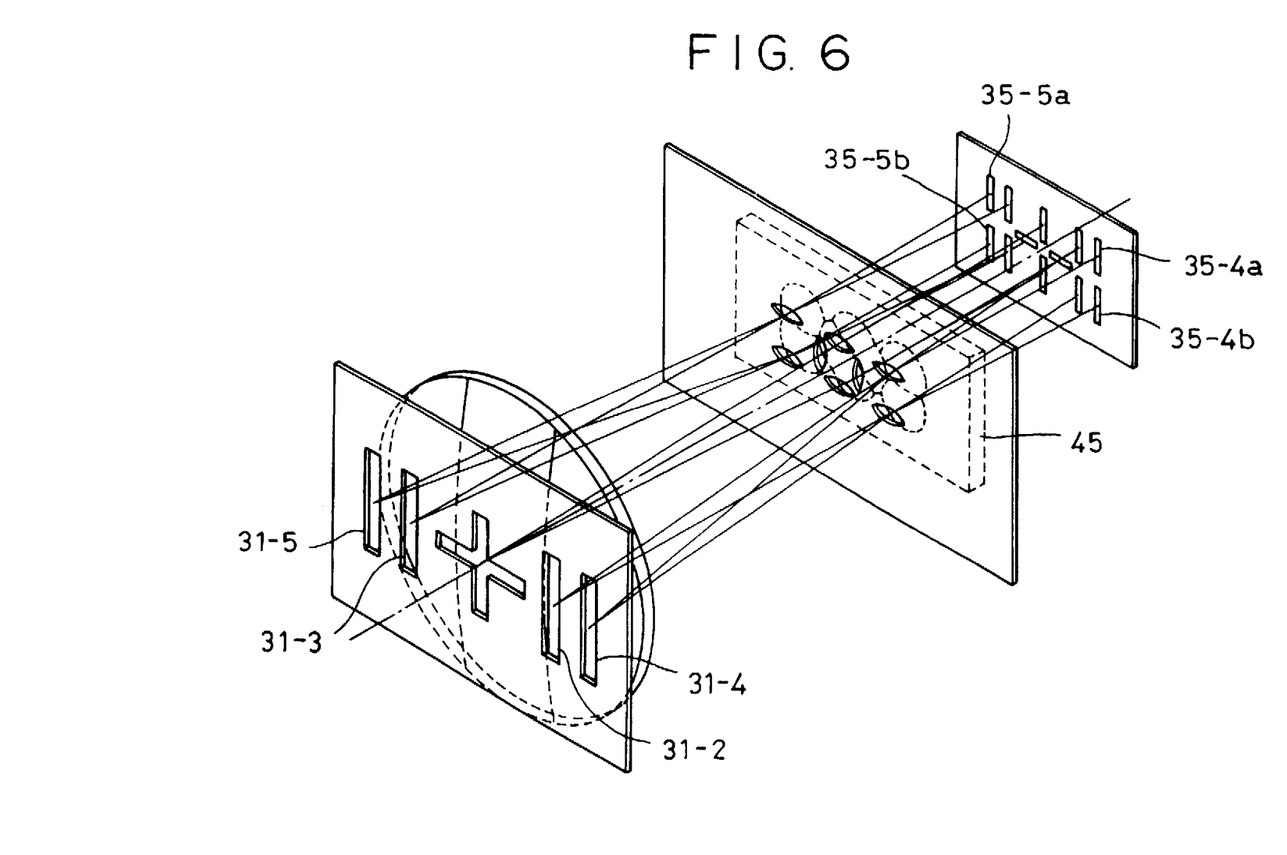
FIG. 6 is a schematic view of a portion of a second embodiment according to the present invention.

FIG. 6 is a schematic view of a focus detection device according to another embodiment of the present invention.

In this embodiment, the secondary optical system is constructed in a manner similar to that shown in FIG. 9. However, four apertures 31-2, 31-3, 31-4 and 31-5, two each on the right and left positioned in the peripheral field are arranged, and also, the number of an array of sensors is increased to four 35-4a, 35-4b, 35-4c and 35-4d. Although the number of focus detection regions is increased, the present invention is applicable in a manner similar to the method described above.

As will be clearly understood from the foregoing description, the present invention offers the following advantages.

Since the respective components in the present invention are arranged as described above, the focus detection signals with respect to a plurality of detection regions (range-finding regions) can be corrected by employing the correction values regarding the respective photographic lenses and can be easily found by an appropriate calculation process, thus achieving a focus detection device which is capable of highly-precise focus detection without requiring a storage element with a high-density capacity.

The individual components shown in outline or designated by blocks in the Drawings are all well-known in the focus detection arts and their specific construction and operation are not critical to the operation or best mode for carrying out the invention.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A focus detection device for an objective lens, comprising:

a storage device which contains a stored focus correction value for at least one predetermined region in a field of focus of said objective lens;

detection means for detecting a focus state of the objective lens with respect to another region located at a given distance from said predetermined region and for producing a corresponding detection signal; and calculation means for calculating a correction value for said another region on the basis of said given distance and said stored focus correction value.

2. A focus detection device according to claim 1, wherein said storage device contains a plurality of stored focus correction values which correspond, respectively, to each of several predetermined regions in said field of focus of said objective lens.

3. A focus detection device according to claim 1, wherein said detection means detects the focus state of said objective lens according to a distribution of light transmitted through different regions of a pupil of the objective lens.

4. A focus detection system comprising:

objective lens means for viewing a field having a plurality of regions;

detection means for detecting the focus state of said objective lens with respect to at least one of a plurality of regions in said field, and producing a corresponding detection signal;

storage means for storing a first correction value for correcting the detection signal produced by said detection means with respect to another of said plurality of predetermined regions, said another region being located a predetermined distance from said one region; and calculation means for calculating a second correction value for correcting said detection signal, said calculation means being constructed and arranged to calculate said second correction value based on said given distance and on said first correction value.

5. A focus detection device according to claim 1, wherein said storage device contains a plurality of correction values corresponding, respectively, to a plurality of predetermined regions in said field of focus of said objective lens and wherein said calculation means calculates a correction value for said other region on the basis of said detection signal and on the basis of at least two of said plurality of correction values.

6. A focus detection device according to claim 5, wherein said calculation means is constructed to calculate said correction value for said other region based on a linear equation.

7. A focus detection device according to claim 5, wherein said calculation means is constructed to calculate said correction value for said other region based on a quadratic equation.

8. A focus detection device according to claim 5, wherein said calculation means is constructed to calculate said correction value for said other region based on a at least three of said stored correction values.

9. A focus detection system according to claim 4, wherein said detection means detects a focus state of said objective lens means according to a distribution of light transmitted through different regions of a pupil of said objective lens means.

10. A focus detection system according to claim 4, wherein said storage means stores an additional correction value for another region among the plurality of regions and said calculation means calculates the second correction value on the basis of the correction values stored in said storage means.

* * * * *

UNITED STATES PATENT AND TRADEMARK OFFICE
CERTIFICATE OF CORRECTION

PATENT NO. : 5,797,049

DATED : August 18, 1998

INVENTOR(S): KEIJI OHTAKA, ET AL.

It is certified that error appears in the above-identified patent and that said Letters Patent is hereby corrected as shown below:

ON THE TITLE PAGE AT [56] References Cited
 U.S. PATENT DOCUMENTS, "Kusaker" should read --Kusaka--.

COLUMN 2
 Line 64, "each" should read --each of the--.

COLUMN 5
 Line 44, "D.R." should read --DR.--.

COLUMN 8
 Line 19, "value" should read --values--.

Signed and Sealed this

Twenty-seventh Day of April, 1999

Attest:

Q. TODD DICKINSON

*Attesting Officer*   *Acting Commissioner of Patents and Trademarks*